United States Patent [19]

Tanuma et al.

[11] Patent Number: 5,352,530
[45] Date of Patent: Oct. 4, 1994

[54] TRANSPARENT FILMS AND LAMINATES HAVING THE SAME

[75] Inventors: Itsuo Tanuma, Sayama; Hideo Takeichi, Tanashi; Hiromi Ohtsuru; Toshio Honda, both of Akigawa, all of Japan

[73] Assignee: Bridgestone Corporation, Tokyo, Japan

[21] Appl. No.: 895,457

[22] Filed: Jun. 8, 1992

Related U.S. Application Data

[60] Continuation of Ser. No. 481,258, Feb. 20, 1990, abandoned, which is a division of Ser. No. 338,507, Apr. 14, 1989, Pat. No. 4,935,470, which is a continuation of Ser. No. 944,112, Dec. 22, 1986, abandoned.

[30] Foreign Application Priority Data

Dec. 23, 1985 [JP] Japan .................................. 60-287987

[51] Int. Cl.$^5$ .............................................. B32B 17/10
[52] U.S. Cl. ...................... 428/442; 136/251; 148/33.3; 257/40; 257/794; 257/795; 359/359; 359/589; 428/209; 428/210; 428/422.8; 428/441; 428/457; 428/463; 428/483; 428/913
[58] Field of Search ............... 428/422.8, 412, 441, 428/442, 461, 463, 480, 483, 475.5, 475.8, 520, 522, 457, 209, 210, 913; 136/251; 359/359, 589; 257/40, 794, 795; 148/33.3

[56] References Cited

U.S. PATENT DOCUMENTS 4,461,922  7/1984  Gay et al. ............................. 136/249
4,945,002  7/1990  Tanuma et al. .................. 428/425.6

Primary Examiner—D. S. Nakarani
Attorney, Agent, or Firm—Sughrue, Mion, Zinn, Macpeak & Seas

[57] ABSTRACT

A highly transparent film having high strength, suitable extensibility, high weather resistance, low moisture absorption and so on is disclosed, which consists mainly of EVAT. And also various laminates making the most of the above properties of the film are disclosed, which comprise the EVAT interposed between two inorganic material sheets, two organic material sheets, or an inorganic material sheet and an organic material sheet.

2 Claims, 1 Drawing Sheet

Triallyl Isocyanurate

Ethylene-Vinyl Acetate Copolymer

Crosslinked Point

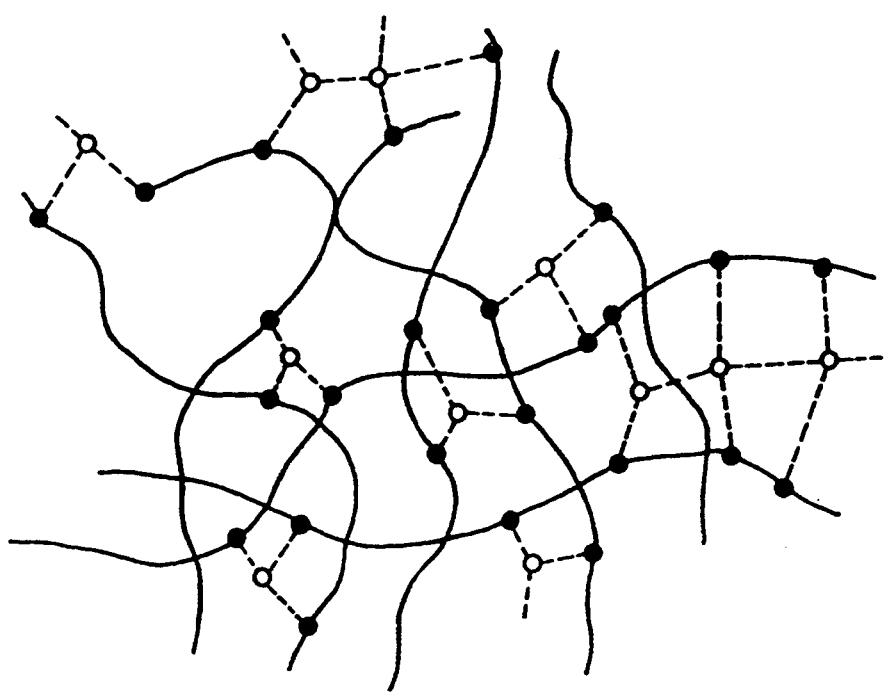
 Triallyl Isocyanurate
 Ethylene-Vinyl Acetate Copolymer
● Crosslinked Point

TRANSPARENT FILMS AND LAMINATES HAVING THE SAME

This application is a continuation of application No. 07/481,258, filed on Feb. 20, 1990, now abandoned, which is a divisional of application No. 07/338,507, filed on Apr. 14, 1989, issued as U.S. Pat. No. 4,935,470 on Jun. 19, 1990, which is a continuation of application No. 06/944,112, filed on Dec. 22, 1986, now abandoned.

BACKGROUND OF THE INVENTION

1. Field of the Invention

This invention relates to an improved transparent film and various laminates having the same.

2. Related Art Statement

There has hitherto been proposed a method wherein a transparent film consisting mainly of ethylene vinyl acetate copolymer is used as an intermediate layer in a sandwich glass (Japanese Patent Application laid open No. 57-196,747). The transparent film of ethylene vinyl acetate copolymer solves a defect in a transparent film of polyvinyl butyral in the prior art, namely such a defect that the heat resistance or the humidity resistance is poor, but produces a haze (white haze) in a cooling cycle. When the cooling is further progressed, the haze substantially disappears, but such a phenomenon that a little haze still remains is observed.

In particular, when a laminate having the film is produced with the use of an autoclave, the cooling rate is low, so that the haze remaining rate is high and as a result, the transparency is somewhat lowered.

SUMMARY OF THE INVENTION

The inventors have made various investigations in order to solve the above problems and found that a highly transparent film having no haze can be produced by using as a main component an ethylene vinyl acetate copolymer triallyl isocyanurate-crosslinked structure (abbreviated as EVAT hereinafter) instead of the ethylene vinyl acetate copolymer, and as a result the invention has been accomplished.

That is, according to a first aspect of the invention, there is the provision of a transparent film consisting mainly of EVAT.

According to a second aspect of the invention, there is the provision of a laminate having a transparent film consisting mainly of EVAT.

BRIEF DESCRIPTION OF THE DRAWING

The single FIGURE is a schematic illustration showing a polymerized and crosslinked state of EVA and triallyl isocyanurate in the transparent film according to the invention.

DETAILED DESCRIPTION OF THE INVENTION

The haze-occurring phenomenon is considered to result from a nonuniform distribution of reflective index, which is caused by temporarily producing a microscopic regularly folded structure of ethylene chains in ethylene vinyl acetate copolymer. Accordingly, in order to prevent the occurrence of haze, the production of the microscopic structure should be controlled. For this purpose, the molecular structure itself of ethylene vinyl acetate copolymer must be changed. Under such a state, only the structure of EVAT can prevent the haze-occurring phenomenon, whereby it is possible to produce a very transparent film.

The triallyl isocyanurates are radically polymerized with each other in the ethylene vinyl acetate copolymer (abbreviated as EVA hereinafter) and at the same time reacted with the EVA to form a polymer of EVA with triallyl isocyanurate, which polymer has a complicated EVAT structure as shown in the figure. Due to such a structure, it is hard to produce the microscopic structure of ethylene molecular chains and thus the haze does not occur.

The triallyl isocyanurate is a polymerizable monomer and can not be extracted in a solvent extraction of EVAT and the EVAT is very transparent, so that it is considered that the EVA is surely bonded to the polymerized triallyl isocyanurate as shown in the figure and as a result, the EVAT is no ordinary mixture of EVA with triallyl isocyanurate. If it were a mixture, the film would become white by a light scattering resulting from the uniform distribution of reflective index, and thus the transparency would be lowered.

By the above reason, in the EVAT structure, the haze-occurring phenomenon is not observed in spite of the period for which the film is exposed to a certain temperature in a cooling and heating cycle.

The structure of EVAT is formed by dissolving the triallyl isocyanurate in the ethylene vinyl acetate copolymer and then subjecting them to a thermal polymerization, a photopolymerization, or a combination thereof. In the thermal polymerization are used radical polymerization initiators such as organic peroxide and so on, and in the photopolymerization are used photopolymerization initiators such as photosensitizer and so on. Further, in case of using the combination of the thermal polymerization and the photopolymerization, use may be made of the peroxide and the photosensitizer. Incidentally, electron rays, α-rays or the like may be irradiated as the other methods.

There can be used any organic peroxide capable of decomposing at a temperature of 100° C. to produce radicals. In consideration of the stability in the compounding, however, it is preferred to have a half-life period of 10 hours and a decomposition temperature of not lower than 70° C. For instance, mention may be made of 2,5-dimethylhexane-2,5-dihydro peroxide, 2,5-dimethyl-2,5-di(tert-butylperoxy)hexane-3,di-tert-butyl peroxide, tert-butyl cumyl peroxide, 2,5-dimethyl-2,5-di(tert-butylperoxy)hexane, dicumyl peroxide, α,α'-bis(-tert-butylperoxyisopropyl) benzene, n-butyl-4,4-bis(-tert-butylperoxy) valerate, 2,2-bis(tert-butylperoxy) butane, 1,1-bis(tert-butylperoxy) cyclohexane, 1,1-bis(-tert-butylperoxy)-3,3-trimethylcyclohexane, tert-butylperoxy benzoate, benzoyl peroxide and the like. These organic peroxides are used alone or as a combination of at least two peroxides. The organic peroxide is used in an amount of not more than 5 parts by weight or less based on 100 parts by weight of total amount of ethylene vinyl acetate copolymer and triallyl isocyanurate.

There can be used any photosensitizer capable of directly or indirectly producing radicals by irradiating light. For instance, mention may be made of benzoin, benzophenone, benzoin methyl ether, benzoin ethyl ether, benzoin isopropyl ether, benzoin butyl ether, dibenzyl, 5-nitroacenaphthene, hexachlorocyclopentadiene, p-nitrodiphenyl, p-nitroaniline, 2,4,6-trinitroaniline, 1,2-benzanthraquinone, 3-methyl-1,3-diaza-1,9-benzanthrone and the like. At least one of these photosensitizers is added in an amount of not more than 5 parts by weight based on 100 parts by weight of total amount of ethylene vinyl acetate copolymer and triallyl isocyanurate.

In order to improve the adhesion between the EVAT and the other material, a silane coupling agent may be added. For this purpose, there may be used well-known silane coupling agents, for example, γ-chloropropylmethoxysilane, vinyltrichlorosilane, vinyltriethoxysilane, vinyl-tris(β-methoxyethoxy) silane, γ-methacryloxypropyltrimethoxysilane, β-(3,4-ethoxycyclohexyl) ethyl-trimethoxysilane, γ-glycidoxypropyltrimethoxysilane, vinyltriacetoxysilane, γ-mercaptopropyltrimethoxysilane, γ-aminopropyltriethyoxysilane, N-β-(aminoethyl)-γ-aminopropyltrimethoxysilane and the like. Such a silane coupling agent is added in an amount of not more than 5 parts by weight based on 100 parts by weight of total amount of ethylene vinyl acetate copolymer and triallyl isocyanurate.

In order to improve the stability, if necessary, a polymerization inhibitor such as hydroquinone, hydroquinone monomethyl ether, p-benzoquinone, methylhydro-quinone and so on can be added in an amount of not more than 5 parts by weight as described above.

It is also possible to add a colorant, an UV light absorber, an antioxidant, a color change inhibitor and the like other than the above.

The colorant includes inorganic pigments such as metal oxide, metal powder and so on, and organic pigments such as azo compound, phthalocyanine compound, and acidic or basic dyestuff take and so on.

The UV light absorber includes benzophenones such as 2-hydroxyl-4-n-octoxybenzophenone, 2-hydroxy-4-methoxy-5-sulfobenzophenone and so on, benzotriazoles such as 2-(2'-hydroxyl-5-methylphenyl) benzotriazole and so on, salicylate esters such as phenyl salicylate, p-tert-butyl phenyl salicylate and so on, and hindered amines such as bis(2,2,6,6-tetramethyl-4-piperidine) sebacate and so on.

The antioxidant includes amines, phenols, bisphenols and hindered amines, for example, di-tert-butyl-p-cresol, bis(2,2,6,6-tetramethyl-4-piperadyl) sebacate, pentaerythrytil-tetrakis[3-(3,5-di-tert-butyl-4-hydroxyphenyl)propionate], 2,2'-methylene bis(4-methyl-6-tert-butylphenyl).

The color change inhibitor includes salts of higher fatty acids with cadmium, barium, calcium, zinc, lead, tin, aluminum, magnesium, phosphorus and so on, so called metallic soaps.

The content of vinyl acetate in EVA used in EVAT is 15–50% by weight, preferably 19–40% by weight. When the content of vinyl acetate is less than 15% by weight, the transparency is insufficient in the curing at high temperature, while when it exceeds 50% by weight, the transparency is good, but the modulus decreases and the viscosity increases, as a result of which a film can not be formed. Accordingly, the content of vinyl acetate is most preferably within a range of 22–30% by weight. In this case, it is possible to obtain a highly transparent EVAT film having a high modulus and not adhered to the other.

The EVAT contains 0.5–20 parts by weight, preferably 1–5 parts by weight of triallyl isocyanurate based on 100 parts by weight of EVA. When the content triallyl isocyanurate is less than 0.5 parts by weight, the transparency decreases, while when it exceed 20 parts by weight, the extensibility is unfavorably deteriorated.

It is considered to be possible to produce various useful laminates by using the useful properties of the EVAT, such as high transparency, high strength, suitable extensibility, high weather resistance, low moisture absorption and so on. As a result of our investigations, it is preferred that the laminate is produced while the EVAT is polymerized and crosslinked. This reason is due to the fact that the adhesion between the EVAT and the other material in a laminate is held at high level and that air bubbles are apt to be removed between the EVAT and the other material. In this case, the other material includes inorganic materials such as glass, metal, ceramics and so on, and organic materials such as plastic, wood and so on. In order to make the most of the high transparency of the EVAT, particularly, it is very preferred to laminate with a transparent glass sheet or a transparent plastic film.

In the laminates of EVAT and organic or inorganic material, there are layer structures such as inorganic material-EVAT-inorganic material, organic material-EVAT-organic material, inorganic material-EVAT-organic material, inorganic material-EVAT and organic material-EVAT. Consequently, it is possible to produce each kind of very useful laminates as shown below.

In particular, EVAT is advantageously used in laminates such as safety sandwich glass, solar cell panel, liquid crystal display panel, electroluminescence panel, window for preventing excoriation of human body, anti-mist window, anti-ice window, electromagnetic wave-shielding window, heat-reflecting window and so on.

As to the safety sandwich glass, the EVAT is used as an intermediate layer to be interposed between plane or curved glass sheets, whereby it is possible to obtain a safety glass for buildings or vehicles.

When the EVAT is interposed between a semiconductor wafer and a glass sheet and the resulting laminate assembly is subjected to a contact bonding, it is possible to obtain a solar cell for electric power having a high efficiency of electricity generation since the EVAT has a good transmission.

Likewise, when the EVAT is used as an intermediate layer to be interposed between a plastic film and a transparent or opaque glass sheet, it is possible to produce a window for preventing excoriation of human body for buildings and vehicles which does not injure human face and the like with pieces of glass sheet broken by collision of human body.

Further, when fellow glass sheets are superposed each other or a glass sheet is superposed on a plastic film where the EVAT is interposed between them, if a conductive or semiconductive material is applied or vapor-deposited to the surface of the glass sheet or plastic film contacted with the EVAT , t is possible to obtain a high performance anti-mist window for buildings and vehicles anti-ice window, electromagnetic wave-shielding window and heat-reflecting window.

Furthermore, in the production of the liquid crystal display panel or the electroluminescence panel, when various necessary components are superposed at the position of light-transmitting path, if the EVAT having an excellent transparency and a low moisture vapor permeability is used as an intermediate layer, it is possible to obtain a high performance panel.

As the above plastic films, use may be made of transparent synthetic resins such as polyesters, NYLONS, acrylics, polycarbonates and so on, and heat resistant synthetic resins such as polyimides.

The following examples are given in the illustration of the invention and not intended as limitations thereof.

EXAMPLE 1

(a) EVA and triallyl isocyanurate were admixed as main components with the other components based on the compounding recipe shown in the following Table 1 in a roller mill heated at about 80° C. to prepare 6 EVAT resins.

(b) Each of the above EVAT resins was interposed between polyethylene terephthalate films by means of a press to produce a sheet of 0.38 mm in thickness. The sheet was left to stand and cooled to room temperature, thereafter the polyethylene terephthalate films were peeled off. Then, the resulting EVAT resin sheet was interposed between two float glass sheets each having a thickness of 3 mm which were previously washed and dried, and the resulting laminate assembly was introduced into a bag made of polyethylene terephthalate to deaerate the bag and subject the laminate assembly to a prepress bonding at about 80° C. Thereafter, the prepress bonded sandwich glass was introduced into an oven, in which it was heated under atmospheric pressure for 15 minutes after the temperature of the glass surface was reached to 150° C. The resulting sandwich glasses each have a high transparency and no optical distortion.

(c) In the process of taking out the sandwich glass heated and cured from the oven and cooling it, the existence of haze was observed. The results are shown in Table 1. In the sandwich glasses having the EVAT. the occurrence of haze was not substantially observed.

Comparative Examples

Sandwich glasses were produced in the same manner as in Example 1, except that EVA only or EVA and trimethylol propane trimethacrylate were used as main components, to observe the existence of haze. As seen from the results shown in Table 1, the occurrence of visible haze was observed. In this case, the addition of trimethylol propane trimethacrylate somewhat exhibited an effect based on that addition, but this effect was very small as compared with the invention.

Comparative Example, to measure haze values by means of a Color Computer SM-3 type made by Suga Sikenki Co. Each of average values is shown in Table 1.

As seen from the results shown in Table 1, according to the invention, it is possible to obtain a sandwich glass having the substantially same haze value as that of a glass sheet, viewed from the fact that the haze values in the invention are all not more than 0.6% and the haze value in two float glass sheets each having a thickness of 3 mm is within a range of 0.3–0.5%. As a result, the EVAT is apparently excellent in transparency.

EXAMPLE 3

Four specimens for impact test according to JIS having a size of 600×600 mm and four specimens for penetration resistance test having a size of 894×1,829 mm were made respectively from the sandwich glass produced according to the same manner as in Example 1. Then, the impact test (dropping test) and the penetration resistance test (shot back test) were carried out with respect to these specimen. All specimens were came up to the standards of the tests.

What is claimed is:

1. A laminate comprising two glass sheets, two transparent films sandwiched therebetween, each film consisting essentially of an ethylene vinyl acetate copolymer triallyl isocyanurate-crosslinked structure, and a semiconductor wafer interposed between the films; wherein, (a) the content of vinyl acetate in the ethylene vinyl acetate copolymer of the ethylene vinyl acetate copolymer triallyl isocyanurate-crosslinked structure is 15–50% by weight, and (b) the content of triallyl isocyanurate based on 100 parts by weight of the ethylene vinyl acetate copolymer is 0.5–20 parts by weight.

2. A safety sandwich glass comprising a transparent film interposed between two glass sheets wherein said transparent film consists essentially of an ethylene vinyl acetate copolymer triallyl isocyanurate-crosslinked structure; and, wherein, (a) the content of vinyl acetate in the ethylene vinyl acetate copolymer of the ethylene vinyl acetate copolymer triallyl isocyanurate-crosslinked structure is 15–50% by weight, and (b) the content of triallyl isocyanurate based on 100 parts by weight of the ethylene vinyl acetate copolymer is 0.5–20 parts by weight.

* * * * *

TABLE 1

| | Example | | | | | | Comparative Example (parts by weight) | | | |
|---|---|---|---|---|---|---|---|---|---|---|
| | 1 | 2 | 3 | 4 | 5 | 6 | 1 | 2 | 3 | 4 |
| Ethylene vinyl acetate copolymer resins | | | | | | | | | | |
| Vinyl acetate content 25% Melt index value 2 | 95 | | | | | | 100 | | | |
| Vinyl acetate content 26% Melt index value 4 | | 95 | | 98 | 97 | 95 | | 100 | | 95 |
| Vinyl acetate content 28% Melt index value 6 | | | 95 | | | | | | 100 | |
| triallyl isocyanurate | 5 | 5 | 5 | 2 | 3 | 5 | | | | |
| trimethylol propane trimethacrylate | | | | | | | | | | 5 |
| Percumyl D (dicumyl peroxide) | 1 | 1 | 1 | 1 | 1 | | 1 | 1 | 1 | 1 |
| Perhexa 2,5B(2,5-dimethyl-2,5-di(tert-butylperoxy)hexane) | | | | | | 1 | | | | |
| γ-methacryloxypropyltrimethoxysilane | 0.7 | 0.3 | 0.3 | 0.3 | 0.3 | 0.3 | 0.3 | 0.3 | 0.3 | 0.3 |
| Haze value (%) | 0.6 | 0.5 | 0.5 | 0.6 | 0.55 | 0.6 | 0.9 | 0.7 | 0.7 | 0.65 |
| Haze | ○ | ◉ | ◉ | ○ | ○ | ○ | X | X | Δ | Δ |

◉ ... No haze, ○ ... Substantially no haze (impossible to judge)
Δ ... A little occurrnce of visible haze
X ... Apparent occurrnce of white haze

EXAMPLE 2

Three specimens having a size of 50×50 mm were cut off from the circumference of center portion of each of the sandwich glasses produced in Example 1 and